United States Patent
Schulz et al.

(10) Patent No.: US 10,600,098 B2
(45) Date of Patent: Mar. 24, 2020

(54) SYSTEMS AND METHODS FOR TARGETED ASSISTANCE ON USER CHECK-IN

(71) Applicant: PAYPAL, INC., San Jose, CA (US)

(72) Inventors: Egan Schulz, San Jose, CA (US); Michelle Serrano, San Jose, CA (US); Libo Su, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 69 days.

(21) Appl. No.: 15/384,169

(22) Filed: Dec. 19, 2016

(65) Prior Publication Data

US 2017/0099575 A1   Apr. 6, 2017

Related U.S. Application Data

(63) Continuation of application No. 14/138,539, filed on Dec. 23, 2013, now abandoned.

(51) Int. Cl.
| | |
|---|---|
| *G06Q 30/06* | (2012.01) |
| *H04W 4/02* | (2018.01) |
| *G06Q 10/06* | (2012.01) |
| *H04W 4/029* | (2018.01) |
| *H04W 76/14* | (2018.01) |
| *H04W 4/80* | (2018.01) |
| *H04W 8/00* | (2009.01) |

(52) U.S. Cl.
CPC ... *G06Q 30/0613* (2013.01); *G06Q 10/06315* (2013.01); *H04W 4/02* (2013.01); *H04W 4/029* (2018.02); *H04W 4/80* (2018.02); *H04W 8/005* (2013.01); *H04W 76/14* (2018.02)

(58) Field of Classification Search
CPC .............................................. G06Q 10/06315
USPC ....................................................... 705/7.25
See application file for complete search history.

(56) References Cited

U.S. PATENT DOCUMENTS

| | | | |
|---|---|---|---|
| 7,071,842 B1 * | 7/2006 | Brady, Jr. ............. | H04W 4/029 340/988 |
| 2002/0131393 A1 * | 9/2002 | Baldridge ......... | H04W 74/0875 370/343 |

(Continued)

OTHER PUBLICATIONS

Radisch et al. (Wendling, C., J. Radisch and S. Jacobzone (2013), "The Use of Social Media in Risk and Crisis Communication", OECD Working Papers on Public Governance, No. 24, OECD Publishing, Paris, https://doi.org/10.1787/5k3v01fskp9s-en, Dec. 17, 2013).*

*Primary Examiner* — Johnna R Loftis
*Assistant Examiner* — Matthew D Henry
(74) *Attorney, Agent, or Firm* — Haynes and Boone LLP (57) ABSTRACT

There are provided systems and method for targeted assistance on user check-in. A service location may provide beacons at or near the location to determine if a user approaching or at the service location has any experience with the service location. For example, a merchant may place a beacon at the entrance to a store to determine if a user has shopped at the store. Thus, when a user is in proximity to the beacon, a user device of the user and the beacon may establish a check-in. Through a user identifier communicated to the beacon, the service provider at the location may determine a user history, such as a number of visits by the user to the service location. The service location may then provide targeted assistance, such as information, personal help, item searches, etc., based on the user's history with the merchant.

20 Claims, 5 Drawing Sheets

(56) References Cited

U.S. PATENT DOCUMENTS

| | | | | |
|---|---|---|---|---|
| 2007/0054641 | A1* | 3/2007 | Goedicke | H04W 52/50 455/226.2 |
| 2009/0322513 | A1* | 12/2009 | Hwang | A61B 5/02055 340/539.12 |
| 2010/0061294 | A1* | 3/2010 | Proctor, Jr. | H04W 4/029 370/328 |
| 2012/0100869 | A1* | 4/2012 | Liang | G06Q 30/0255 455/456.1 |
| 2012/0130823 | A1* | 5/2012 | Levin | G06Q 30/0241 705/14.69 |
| 2013/0040654 | A1* | 2/2013 | Parish | H04L 63/0807 455/456.1 |
| 2013/0080911 | A1* | 3/2013 | Klemm | G06F 16/958 715/745 |
| 2013/0198039 | A1* | 8/2013 | Sridharan | G06Q 30/016 705/26.44 |
| 2014/0289850 | A1* | 9/2014 | Yu | H04W 8/16 726/22 |

* cited by examiner

FIG. 1

Service Provider Server 240

Service Provider Application 250

Identifiers 252

- User A  254a
  - First visit
  - Identifier from Spain
  - Purchased item A in past 3 times elsewhere
  - Novice level
  - No standing requests

- User B  254b
  - Fifth visit
  - English language preferred
  - 3 item A, 2 item B, purchase at location Y
  - Expert level
  - Requests hearing impaired help Service Information 256

- Offers item A, B, C
- Novice, intermediate, expert help
- Spanish, English, French, Italian assistance available

SYSTEMS AND METHODS FOR TARGETED ASSISTANCE ON USER CHECK-IN

CROSS-REFERENCE TO RELATED APPLICATIONS

This application is a continuation of U.S. patent application Ser. No. 14/138,539, filed Dec. 23, 2013, all of which is hereby incorporated by reference in its entirety

TECHNICAL FIELD

The present application generally relates to targeted assistance on user check-in and more specifically to providing short range wireless beacons at a service provider location to check-in a user and determine user history information for targeting assistance to the user.

BACKGROUND

Users may visit locations that they are unfamiliar with to engage in transactions. For example, a user may visit a merchant to purchase a toy for a child, but not know what the type of toy it is, whether the toy is age appropriate for the child, or whether the child would require additional items with the toy (e.g., adapters, batteries, accessories, etc.). In other embodiments, a user may travel to a new location offering a service, such as a transportation center, hospital, movie theater, etc., where the user is unfamiliar with the layout of the location. The user may require assistance finding specific areas of the location, or may require personalized assistance with the location. However, without prior knowledge of the location, the user may not be able to find assistance easily, or may become lost in the location. The user may also feel uncomfortable asking for assistance or have prior bad experiences with salespersons, information desks, or other information services at similar service providers.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various locations provide short range wireless communications with a user device, such as through Bluetooth Low Energy (BLE) beacon communications. These beacons may be set up at a location and communicate with the user device to alert users of check-in services through their user device. The beacons may provide additional functionality, such establishing a connection with a server entity to complete transactions, including check-in services. Additionally, the beacons may provide communication services to the user device directly, including information stored on the beacons, and/or information from a device or server corresponding to the beacon.

A service provider may include one or more locations where the service provider offers goods, products, services, or other items to a user. The service location(s) may utilize short range wireless beacons to communicate with mobile user devices of the users. The short range wireless beacons may employ BLE communications that emit a signal receivable by a user device. The communication may include an identifier for the beacon. A user device may passively monitor for BLE communications. When a user device detects the signal and verifies the identifier as belonging to the venue (e.g., a venue device and/or server), both the user device and the beacon may ramp up in power and establish a connection, where the connection may further enable the user device to communicate with a service provider device/server. The beacon may be connected to a networked device at the service location, or the beacon may include network functionality to communicate with the service provider server. The service provider may utilize the identifier from the user device to determine a user history for the user. Thus, the user may receive targeted assistance based on the user history, where the targeted assistance may include information about the service location and/or service provider, offers for help, and similar assistance.

As the user arrives at the service location, wireless beacons may establish a communication channel with a user device that the user possesses. The wireless beacons may be located at or nearby the service location, for example, be located at an entrance to the service location, a parking lot of the service location, or residing on or near transportation services to the service location (e.g., a train/airplane arriving at the service location). Establishment of a communication channel may trigger an application on the user device to check the user in to that location and transmit a user identifier to the beacon. The beacon may then communicate the user device identifier to a server. The server may determine a user history using the user identifier.

The user history may be utilized to offer a variety of assistance types to the user. The user identifier may be used to associate the user with a nationality or location of origin to determine a language the user would prefer. For example, the user identifier may correspond to a user account associated with a particular area and/or nationality. The user identifier may also include data taken from the user device of the user, including a selected language. Thus, the assistance may be provided in a language of the user.

The user history may also be used to determine a user experience level with the location and/or service provider. The user history may include a number of visits to the location, or may include prior use of the service provider or a similar service provider. Thus, some users may require novice level assistance, while other users require advanced or expert level assistance. A plurality of types of assistance may be offered to the user, including assistance skill levels corresponding to the experience of the user, assistance in different forms (e.g., general information, help menus, sales associates, etc.), or other assistance type.

The user may also request assistance or be provided with a process to request assistance. For example, the application executing on the user device may include a process (such as a menu selection) to request assistance before any is provided to the user. In other embodiments, the service provider may offer assistance but only provide it on acceptance of the offer. The user may enter assistance preferences that help determine the types of assistance offered and/or provided to the user. Assistance preferences may include a type of assistance, a provider of assistance, and/or a required assistance need, such as a disability need of a user (e.g., hearing impaired, wheelchair access/request, etc.).

Figure 1:
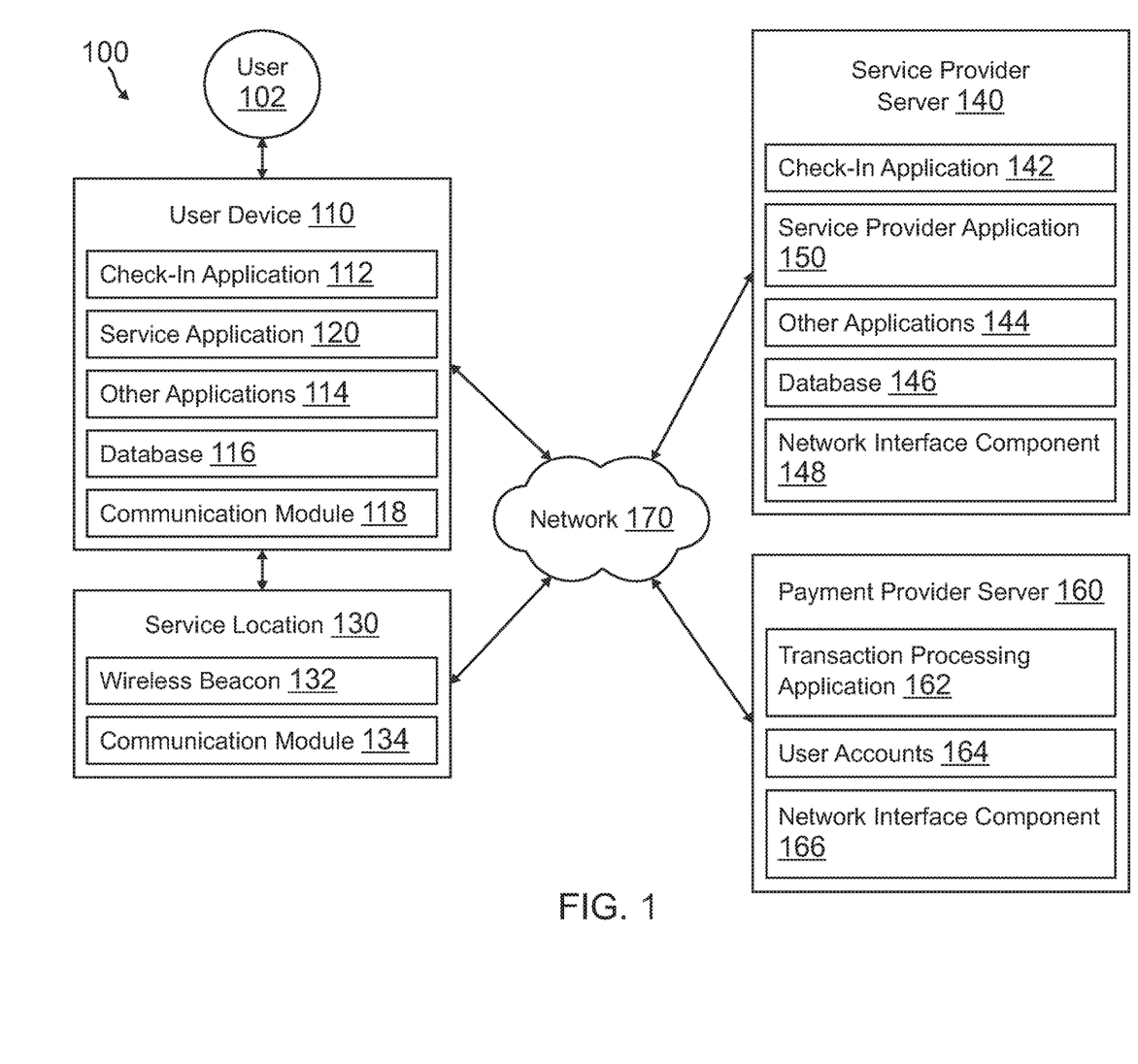
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a service location 130, a service provider server 140, and a payment provider server 160 in communication over a network 170. User 102, such as a visitor to a service location, may utilize user device 110 to check-in to service provider server 140. Service location 130 may correspond to a location that provides goods, products, item, and/or other services to a user including travel, medical, or other services. Service provider server 140 may correspond to a general server for multiple service locations (e.g. a server for a merchant chain) or may be specific to only service location 130 (e.g. a server for a hospital, airport, etc.). Check-in of user 102 may be accomplished through a wireless beacon 132 at service location 130. Once user 102 is checked-in to service provider server 140, a user history of user 102 at service location 130 may be determined. User 102 may then receive targeted assistance corresponding to the user history.

User device 110, service location 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with wireless beacon 132 and service provider server 140. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a check-in application 112, a service application 120, other applications 114, a database 116, and a communication module 118. Check-in application 112, service application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection between user device 110 and service provider server 140. Check-in application 112 may correspond to a specific application utilized by user device 110 with service provider server 140 to complete a check-in with service provider server 140. The check-in with service provider server 140 may correspond to a process to log in to a user account of user 102 with service provider server 140. In other embodiments, the check-in may provide and/or verify identity of user 102, including transmission of an identifier for user 102 and/or user device 110. The check-in may be completed over network 170 with service provider server 140. In such embodiments, check-in application 112 may correspond more generally to a browser application configured to communicate with service provider server 140.

Check-in application 112 may also correspond to an application available over the Internet for download from service provider server 140 and/or other server corresponding to service location 130. Check-in application 112 may be set up to receive short range wireless communications with wireless beacon 132 at service location 130 to complete a check-in process. For example, service location 130 may include infrastructure with wireless beacon 132 to communicate with user device 110 and complete the check-in process with service provider server 140. Wireless beacon 132 may be configured to transmit an identifier for reception by user device 110, as will be explained in more detail herein.

Check-in application 112 may execute in the background of an operating system of user device 110 and be configured to establish connections, using communication module 118 of user device 110, with wireless beacon 132 at service location 130. The connection may be established with or without user input from user 102. For example, wireless beacon 132 may broadcast a token, such as a universally unique identifier (UUID), for reception by check-in application 112, as will be explained in more detail herein. Check-in application 112 may utilize communication module 118 of user device 110 to receive the token from wireless beacon 132. If check-in application 112 acknowledges the UUID as identifying service location 130, wireless beacon 132, and/or service provider server 140, check-in application 112 may transmit an identifier corresponding to user 102 and/or user device 110 back to wireless beacon 132. Check-in application 112 may utilize communication module 118 of user device 110 to communicate with wireless beacon 132 (e.g., over near field communication, Bluetooth, Bluetooth Low Energy, radio, infrared, or other connection). The identifier from user device 110 may include, be transmitted with, concatenated with, or otherwise bundled with the identifier received from wireless beacon 132.

Once a connection is established with wireless beacon 132, user device 110 may be checked-in with service provider server 140 if user 102 has not previously been checked-in. The check-in process may then associate user 102 with wireless beacon 132 used to check-in user 102. In such embodiments, check-in application 112 of user device 110 may utilize short range wireless communication of user device 110 with wireless beacon 132, such as near field communication, Bluetooth, Bluetooth Low Energy, radio, infrared, or other connection. Where wireless beacon 132 corresponds generally to service location 130, user 102 may be associated with service location 130. However, in other embodiments wireless beacon 132 may correspond to a location, item (i.e., a product or good), and/or service at service location 130. Thus, user 102 may be associated with that location, item, and/or service (e.g., a television sales section of a merchant, a departure area of an airport, a neonatal section of a hospital, etc.).

Check-in application 112 may receive information from service provider server 140. For example, check-in application 112 may receive information, maps, processes to request assistance from the service provider, etc. The information may be passed to check-in application 112 generally based on service location 130, such as a map of a store/airport or generally information about service location 130. Additionally, the service provider server 140 may determine a user history corresponding to user 102 from a user identifier transmitted to service provider server 140 during the check-in process, as will be explained in more detail herein. Thus, the information may transmitted to user 102 based on a user history. Since user 102 is already checked-in with service provider server 140, service provider server 140 may know an identifier of user device 110 and transmit the information to user device 110 using that identifier over network 170 and/or through one of wireless beacon 132.

Check-in application 112 may utilize communication module 118 to pass information to service provider server 140, including user assistance preferences, identifiers of user 102 and/or user device 110, request for assistance, a request for a type of assistance, etc. Once check-in application 112 has completed a connection with service provider server 140, user device 110, and thus user 102, may receive targeted assistance, as will be discussed in more detail herein.

Service application 120 may be used, for example, to provide a convenient interface to permit user 102 receive, request, and/or view targeted assistance based on the user history. Service application 120 may correspond to an application specific to service location 130 and/or service provider server 140, such as an application downloadable over network 170 and/or through wireless beacon 132. However, in other embodiments, service application 120 may correspond more generally to any application configured to receive targeted assistance, including a browser application.

Service application 120 may be configured to receive assistance for service location 130. Service application 120 may also be configured to display the assistance. For example, service application 120 may display general information for service location 130, such as a map, merchant store offerings, information desk locations, sales/coupons/rebates, or other general information. Additionally, service provider server 140 may determine a user history based on a user identifier for user 102 and provide targeted assistance to user 102, as will be explained in more detail herein. User 102 may utilize service application 120 to request the targeted assistance, or targeted assistance may be provided to user 102 on check-in with service location 130. Service application 120 may display targeted assistance transmitted to user device 110. Additionally, service application 120 may use a location device and/or application of user device 110, such as a GPS device and application, to locate user 102 at a specific location service location 130, and transmit the specific location to service provider server 140 for use in providing the targeted assistance. In other embodiments, user 102 may be located at the specific location based on a check-in of user device 110 with wireless beacon 132.

Service application 120 may further allow user 102 to enter and/or select preferences or other information for use in determining the targeted assistance. For example, the targeted assistance may be provided in a language; however, user 102 may be more comfortable using another language. Thus, service application 120 may include preference settings to select a language, a presentation option, and/or other user preference for the targeted assistance. Additional user preference for targeted assistance may include a type of targeted assistance, item/product/service specific targeted assistance, category specific targeted assistance, disability needs specific targeted assistance (e.g., vision/hearing impaired, need for a wheelchair or wheelchair access, etc.), or other preference for targeted assistance. Where the targeted assistance may be provided face to face by a salesperson, concierge, or other employee of service location 130, service application 120 may be configured to request the assistance in the preferred language of user 102 or other preference (e.g., male/female assistance preference, employer preference, disability needs preference, etc.). Selection may be done through typing in a preference request, selection of available preferences, and/or selection of preferences determined from the user identifier transmitted on check-in of user 102. Service application 120 may also receive preference information from other user input with user device 110, may receive the information from one or more other applications of user device 110, or may scrape the preference information from one or more online accounts of user 102 (e.g., a social networking account, microblogging account, user account with another service provider, etc.). User preference information may also be determined from the user history and/or user identifier, such as through available information about user 102.

Service application 120 may be further configured to display a user experience level with service location 130 determined from the user history, as will be explained in more detail herein. User 102 may change the experience level using service application 120. In addition to the experience level with service location 130, a plurality of types of targeted assistance may be provided to user 102, such as an option to request in person assistance, an option to download a map of service location 130, a search box to search assistance information, etc.

In various embodiments, check-in application 112 and service application 120 may be incorporated in the same application so as to provide their respective features in one convenient application interface.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications. Other applications 114 may include browser and/or mapping applications where the functions are not provided by check-in application 112 and/or service application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, service application 120, and/or other applications 114, identifiers associated with hardware of user device 110, or other appropriate identifiers, such as identifiers used for payment/user/device authentication or identification. Database 116 may include user device tokens and/or encryption keys, including a public key of service location 130 and/or service provider server 140 for wireless beacon 132. Database 116 may include identifying information for tokens enabling check-in application 112 to identify wireless beacon 132 when receiving a corresponding token. In one embodiment, identifiers in database 116 may be used to associate user device 110 with a particular account maintained by the account provider. Database 116 may further include online account access information.

User device 110 includes at least one communication module 118 adapted to communicate with wireless beacon 132, service provider server 140, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 132 without network 170 using short range wireless communications.

Service location 130 may correspond to a physical location visited by user 102. Service location 130 may further offer targeted assistance services to user 102. For example, service location 130 may correspond to merchant storefronts, shopping malls, amusement parks, concert halls, sports arenas, museums, hospitals, airports, train stations, etc. Service location 130 may include a plurality of locations within service location 130, where each location includes a wireless beacon. For example, a location in service location 130 may correspond to an area of a store offering video games for sale. Wireless beacon 132 may check-in user 102 when user device 110 is in proximity to wireless beacon 132. Thus, wireless beacon 132 enable service provider server 140 to associate user 102 with service location 130 and/or a location within service location 130, as will be explained in more detail herein. Service location 130 may be one of a plurality of locations corresponding to service provider server 140. However, in other embodiments, service provider server 140 may correspond only to service location 130.

Service location 130 includes a wireless beacon 132 and a communication module 134. In other embodiments, service provider 130 may include additional or different software and devices as required Wireless beacon 132 may be maintained, for example, by service location 130 and service provider server 140. Wireless beacon 132 may be implemented using any appropriate hardware and software configured for wireless communication with user device 110. For example, in one embodiment, wireless beacon 132 may be implemented as a dongle device including a hardware processor and a communication module, for example, connected to device at service location 130. Thus, wireless beacon 132 may be implemented as a device incorporated within or attached to a personal computer (PC), a smart phone, personal digital assistant (PDA), laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with user device 110 and/or service provider server 140. Although a single beacon is described, a plurality of wireless beacons may be utilized and be location specific within service location 130, as previous discussed.

Wireless beacon 132 of FIG. 1 contains processes, procedures, and/or applications executable by a hardware processor, for example, a software program, configured to interact with user device 110. Wireless beacon 132 may include applications for transmitting requests to establish a connection between a user device and wireless beacon 132. Thus, wireless beacon 132 may utilize a low energy short range wireless communication of wireless beacon 132 to transmit requests to establish a connection with user device 110, including an identifier such as a Universally Unique Identifier (UUID). If user device 110 receives a request to establish the connection with wireless beacon 132 and responds with a user device identifier (potentially including the UUID and other information to effectuate a check-in of user device 110), wireless beacon 132 may ramp up in power and create a connection between user device 110 and wireless beacon 132.

Wireless beacon 132 may transmit the request to establish the connection with wireless beacon 132 as a short range communication (e.g. a BLE protocol communication) including a "wake up" process for check-in application 112 of user device 110 and/or a token for wireless beacon 132 or service provider server 140. In other embodiments, the request and/or connection may utilize near field communication, radio communication, infrared communication, or Bluetooth communication. The request may be specific to user device 110 by including information that is specific to user 102, such as a name, identifier, or user device identifier. The information specific to user 102 may be determined from a user account of user 102 or other information previously provided to service provider server 140. Thus, in certain embodiments, only user device 110 will pick up and authenticate the request.

After wireless beacon 132 receives a user device identifier from user device 110, wireless beacon 132 may determine user 102 is at or in proximity to service location 130. Wireless beacon 132 may pass the user device identifier to service provider server 140 to complete the check-in process and associate user 102 with service location 130. As shown in FIG. 1, wireless beacon 132 utilizes communication module 134 to pass the information to service provider server 140. However, in other embodiments, wireless beacon 132 may utilize a network connection of wireless beacon 132 through a communication module of wireless beacon 132. Additionally, wireless beacon 132 may keep a communication channel open between user device 110 and service provider server 140 for passing additional information, such as assistance requests, assistance preferences, transaction information, payment information, and/or identification information.

In various embodiments, service location 130 includes at least one communication module 134 adapted to communicate with user device 110, service provider server 140, and/or payment provider server 160. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate directly with user device 110 without network 170 using short range wireless communications.

Service provider server 140 may be maintained, for example, by a service location including one or a plurality of service locations. Generally, service provider server 140 may be maintained by anyone or any entity that establishes and/or maintains a location with services offered to users. In this regard, service provider server 140 may include one or more applications, which may be configured to interact with user device 110 and/or service location 130 to complete check-in processes for user device 110. Service provider server 140 may be further configured to determine and provide targeted assistance to user 102. Additionally, service provider server 140 may receive information from user device 110 for use in determining and providing the targeted assistance. Although only one service provider server is shown, a plurality of service provider servers may be utilized. In various embodiments, the check-in and assistance features of service provider server 140 may also be offered by payment provider server 160. Thus, all or part of the described features and processes of service provider server 140 may be incorporated within payment provider server 160.

Service provider server 140 includes a check-in application 142, a service provider application 150, a database 144, and a network interface component 146. Check-in application 142 and service provider application 150 may correspond to processes, procedures, and/or applications executable by a hardware processor, for example, a software program. In other embodiments, service provider server 140 may include additional or different software as required.

Check-in application 142 may correspond to processes to complete check-in with user device 110. Thus, check-in application 142 may correspond to the server side application of service provider server 140 configured to transmit and/or receive a check-in request from user device 110 and complete the check-in request. The check-in request may include log in information for a user account in database 144 and complete the check-in with user 102 by verifying the account information. However, in embodiments where a user account has not been previously established by user 102 and/or service provider server 140 does not offer user account services, check-in application 142 may receive other information for identifying user 102, include user name/identifier, user device identifier, an identifier for an account with another server (e.g., a payment account/payment account identifier with payment provider server 160), or other information.

Once check-in is completed between user device 110 and service provider server 140, check-in application 142 may be utilized to associate user 102 with a location corresponding to wireless beacon 132, such as service location 130 generally, or a sub-location of service location 130 corresponding to wireless beacon 132. Additionally, check-in application 142 may check user 102 out of the location when user 102 leaves the proximity of wireless beacon 132. For example, when user 102 leaves the proximity of wireless beacon 132 so that user device 110 is no longer in communication with wireless beacon 132, user 102 may be checked-out of the location.

Check-in application 142 may receive a user identifier from user device 110. The user identifier may be utilized to check-in user 102. Additionally, the user identifier may be passed to service provider application 150 to determine and provide targeted assistance to user 102. In addition to a user identifier, check-in application 142 may receive other information during check-in of user device 110, such as a request for assistance, a request for a type of assistance, or user preferences for types of assistance stored by user device 110.

Service provider server 140 further includes service provider application 150 configured to receive information corresponding to user 102 checked-in to wireless beacon 132 through service location 130 and provide targeted assistance to user 102. In this regard, service provider application 150 may receive a user identifier and/or other information for user. Utilizing this information, service provider application 150 may determine and provide the targeted assistance to user 102. The targeted assistance may be requested by user 102 prior to, during, and/or after check-in with service provider server 140. For example, user 102 may set a preference in service application 120 to request assistance when user device 110 completes check-in, may request assistance ahead of time over network 170 for delivery when user device 110 completes check-in, or may request assistance based on an option transmitted to user device 110.

Service provider application 150 may utilize the user identifier received from user device 110 to determine the targeted assistance to provide user 102. For example, the user identifier may be utilized to determine a number of visits by user 102 to service location 130 or a similar service location. Service provider server 140 may track the number of times the user identifier has been checked-in to service location 130 or a similar location corresponding to service provider server 140 (e.g., another merchant store of service provider server 140) and/or may query another server over network 170 to determine if user 102 has visited a similar location. The user identifier may also correspond to a user account of user 102 with another server, such as payment provider server 160. In such embodiments, service provider server 140 may determine a user history from information received from payment provider server 160. Payment provider server 160 may provide information of a number of purchases/visits by user 102 at the same or similar locations to service location 130 or may provide other information.

In various embodiments, the user identifier may be utilized to determine a location of origin of the user identifier, a location of use of a user account corresponding to the user identifier, and/or a nationality of the user. This information may be utilized to provide targeted assistance by allowing service provider application 150 to determine user assistance preferences such as a preferred language for the assistance, a type of assistance, assistance items/services of interest, etc. The targeted assistance may then be provided using these parameters, for example, in the preferred language. Additionally, the user identifier may include additional information, such as user preferences for targeted assistance. In a specific embodiment, the user identifier may include a request for disability assistance (e.g., hearing/vision impaired, wheel chair accessibility, etc.), where service provider application 150 may provide targeted assistance using the disability assistance needs of user 102.

The user history determined from the user identifier may also be used to determine a user experience with service location 130. The user history may include a number of visits to service location 130 or may include past requests for assistance and the type of assistance provided. Thus, if user 102 has visited service location 130 over 10 times in the past, or has always requested expert level assistance at service location 130, targeted assistance corresponding to this user history may be provided. The user history may include other past information about user 102 including in person assistance, text and/or map assistance, disability assistance, etc. In various embodiments, a plurality of types of assistance may be provided to user 102 generally, or targeted based on user 102's history, and user 102 may select one of the plurality of types of assistance.

Service provider application 150 may receive user preferences prior to or after transmitting targeted assistance to user 102. For example, user 102 may set user preference for types of assistance (e.g., in person, male/female assistance, language preference, etc.) that may be transmitted to service provider server 140 on check-in of user 102 with service location 130. In other embodiments, user 102 may receive targeted assistance and wish to refine the targeted assistance and/or receive other targeted assistance. Thus, user 102 may provide user assistance preferences, such as assistance targeted to a specific item or item category, a different language selection, a map of service location 130, etc., instead of the targeted assistance previously provided to user 102.

In various embodiments, service provider server 140 includes other applications 144 as may be desired in particular embodiments to provide features to service provider server 140. For example, other applications 144 may include security applications for implementing server-side security features, programmatic server applications for interfacing with appropriate application programming interfaces (APIs) over network 170, or other types of applications. Other applications 144 may contain software programs, executable by a processor, including a graphical user interface (GUI), configured to provide an interface to a user.

Service provider server 140 further includes database 146 which may include, for example, identifiers such as operating system registry entries, cookies associated with check-in application 142 and/or service provider application 150, identifiers associated with hardware of service provider server 140, or other appropriate identifiers, such as identifiers used for payment/user/device authentication or identification. Database 146 may include identifiers and/or user accounts of user 102, which may comprise an identifier for user 102 and/or user device 110. In various embodiments, identifiers in database 146 may be used by a payment/credit provider, such as payment provider server 160, to associate user 102 with a particular account maintained by payment provider server 160. For example, an identifier for a payment account with payment provider server 160 may be stored with a user account or identifier of user 102 in database 146. In other embodiments, a user account stored in database 146 may include a shared identifier with the payment account with payment provider server 160.

In various embodiments, service provider server 140 includes at least one network interface component 148 adapted to communicate with user device 110, service location 130, and/or payment provider server 160 over network 170. In various embodiments, communication module 146 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices Payment provider server 160 may be maintained, for example, by an online payment service provider, which may provide user account and payment services on behalf of user 102 and other users. In this regard, payment provider server 160 includes one or more processing applications, which may provide payment for items using a user account with payment provider server 160. In one example, payment provider server 160 may be provided by PAYPAL®, Inc. of San Jose, Calif., USA. However, in other embodiments, payment provider server 160 may be maintained by or include a merchant, financial services provider, and/or other service provider, which may provide user account services to user 102. Although payment provider server 160 is described as separate from service provider server 140, it is understood that payment provider server 160 may include services offered by service provider server 140 and vice versa.

Payment provider server 160 of FIG. 1 includes a transaction processing application 162, a database 164, and a network interface component 166. Transaction processing application 162 may correspond to processes, procedures, and/or applications executable by a hardware processor, for example, a software program. In other embodiments, payment provider server 160 may include additional or different software as required.

Transaction processing application 162 may be configured to receive information from user device 110 and/or service provider server 140 for processing and completion of financial transactions. Transaction processing application 162 may include one or more applications to process financial transactions between user device 110 and/or service provider server 140. Financial transactions may include financial information corresponding to user debit/credit card information, checking account information, a user account (e.g., payment account with payment provider server 160), or other payment information. Transaction processing application 162 may complete the financial transaction for the purchase request by providing payment to service provider server 140. In various embodiments, transaction processing application 162 may provide transaction histories, including receipts, to user device 110 in order to provide proof of purchase for an item and/or service. Transaction processing application 162 may also provide the transaction histories to service location 130 for use in pick-up/delivery of the item and/or service.

Additionally, payment provider server 160 includes user accounts 164. As previously discussed, user 102 may establish one or more user accounts with payment provider server 160. User accounts 164 may include user information, such as name, address, birthdate, payment/funding information, additional user financial information, and/or other desired user data. Information in user account 164 may be utilized by service provider server 140 to determine and provide targeted assistance to user 102, such as determining a country of origin/nationality for user 102 and providing targeted assistance in a preferred language. User 102 may link user accounts to user device 110 through a user identifier. Thus, when the user identifier corresponding to user device 110 is transmitted to payment provider server 160, e.g., from service provider server 140, a user account belonging to user 102 may be identified. In other embodiments, user 102 may not have previously established a user account and information of user 102 may be determined through the use of the user identifier with payment provider server 160.

In various embodiments, payment provider server 160 includes at least one network interface component 166 adapted to communicate with user device 110, service location 130, and/or service provider server 140 over network 170. In various embodiments, network interface component 166 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
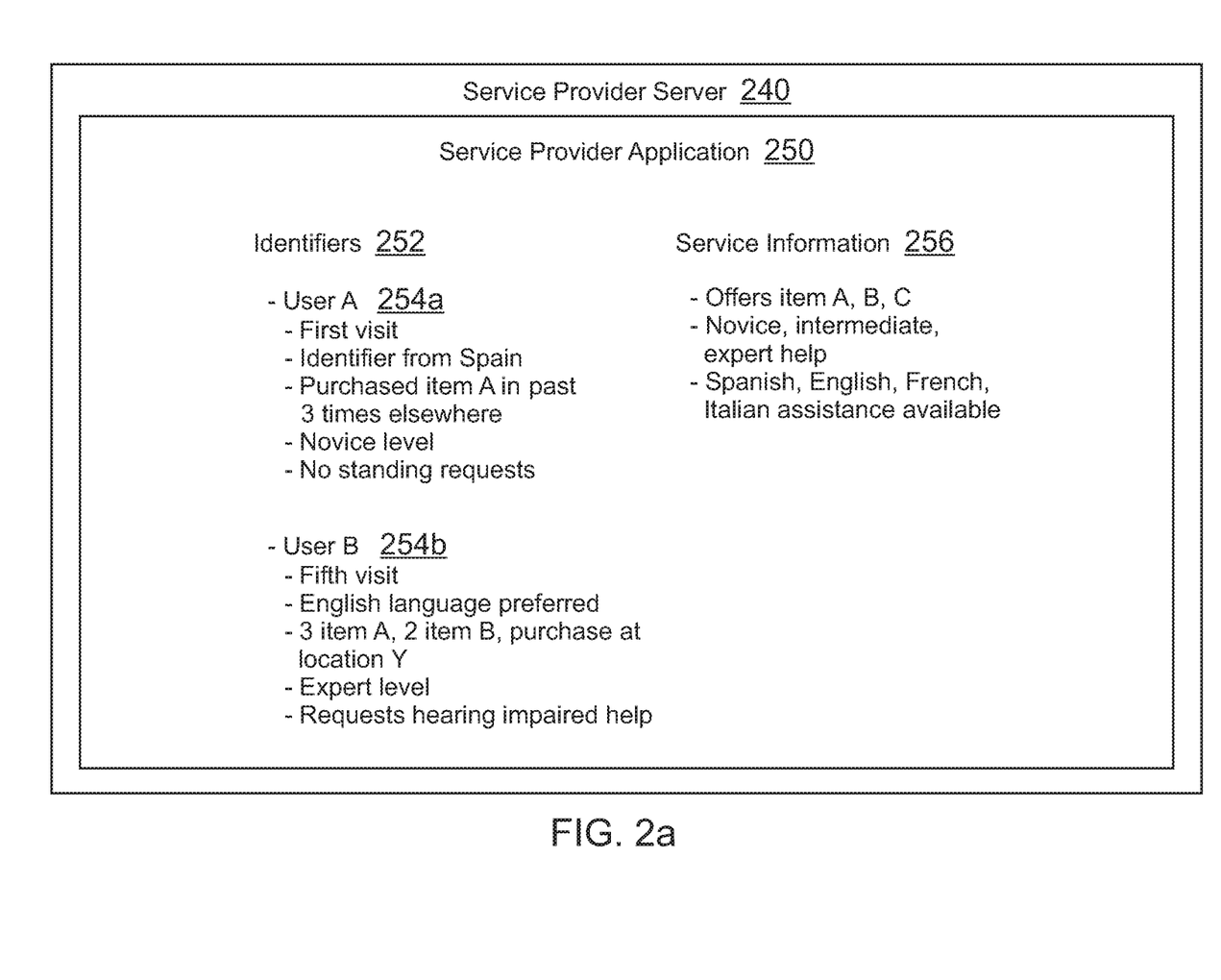
FIG. 2A is an exemplary service provider including user information to provide targeted assistance to a checked-in user, according to an embodiment.

FIG. 2A is an exemplary service provider including user information to provide targeted assistance to a checked-in user, according to an embodiment. FIG. 2A includes an environment 200 having a service provider server 240 and a service provider application 250 corresponding generally to service provider server 140 and service provider application 150, respectively, of FIG. 1.

According to FIG. 2A, service provider server 240 executes service provider application 250 to determine what targeted assistance to provide a user A and/or a user B. Thus, service provider application 250 includes identifiers 252 having a user A 254a and a user B 254b. Additionally, service provider application 250 includes a service information 256.

Identifiers 252 may correspond generally to received identifiers from a user check-in with a wireless beacon at a service location. Thus, identifiers 252 may display one or a plurality of identifiers corresponding to the users at the service location. Service provider application 250 may receive the identifiers from a check-in with a check-in application of service provider server 240. Service provider application 250 may then utilize identifiers 252 to determine a user history with the same or similar service location.

Identifiers 252 includes user A 254a and user b 254b corresponding generally to identifiers for a user A and a user B, respectively, checked-in to a service location. User A 254a includes a user history having a list of characteristics, parameters, and other information corresponding to user A. Additionally, user B 254b includes a user history for user B. Service provider application 250 may determine the user histories under user A 254a and user B 254b from past information stored by service provider server 240. For example, the user history for user A 254 includes "first visit," "novice level," and "no standing requests." Thus, service provider server 240 may have no history of previous check-ins for user A and no stored information about assistance requests. However, the user history for user B 254b includes "fifth visit," "English language preferred," "3 item A, 2 item B purchases at location Y," "expert level," and "requests hearing impaired help." Thus, user B may previously have established 5 check-ins for user B with the service location, may have set their experience level with the service location to "expert level," and may request hearing impaired assistance. Additionally, user B may be interested in assistance for items A and/or B, and prefer the assistance in English.

Additionally, the user histories for user A and user B may be include information from one or more other sources. The user history under user A 254a includes "identifier from Spain," "purchased item A in past 3 times elsewhere," and "novice level." Thus, service provider application 250 may request information for the user identifier user A 254a from another source, such as a provider of the identifier (e.g., an account provider where the identifier user A 254a corresponds to a user account identifier). Service provider application 250 may then determine where the identifier originates and what the identifier has previously been used for. Thus, service provider application 250 may determine that user A would prefer assistance in Spanish and/or may be interested in item A. Other information about user A 254a may also be determined, such as personal information, experience with the service location (e.g., novice level), disability information, etc.

In contrast to user A, user B 254b includes information that may be stored with service provider server 240 based on past check-ins with service provider server 240. However, service provider server 240 may also request information from other sources for the identifier user B 254b on each new check-in of user B with service provider server 240.

Service provider server 240 further includes service information 256, which may assist service provider application 250 in determining the targeted assistance to send user A and user B. For example, service information 256 may correspond to available assistance at a service location where user A and user B are checked-in. Thus, service information 256 includes "offers item A, B, C," "novice, intermediate, and expert help," and "Spanish, English, French, Italian assistance available." Using this information, service provider application 250 may determine targeted assistance for user A and user B using these parameters.

Figure 2B:
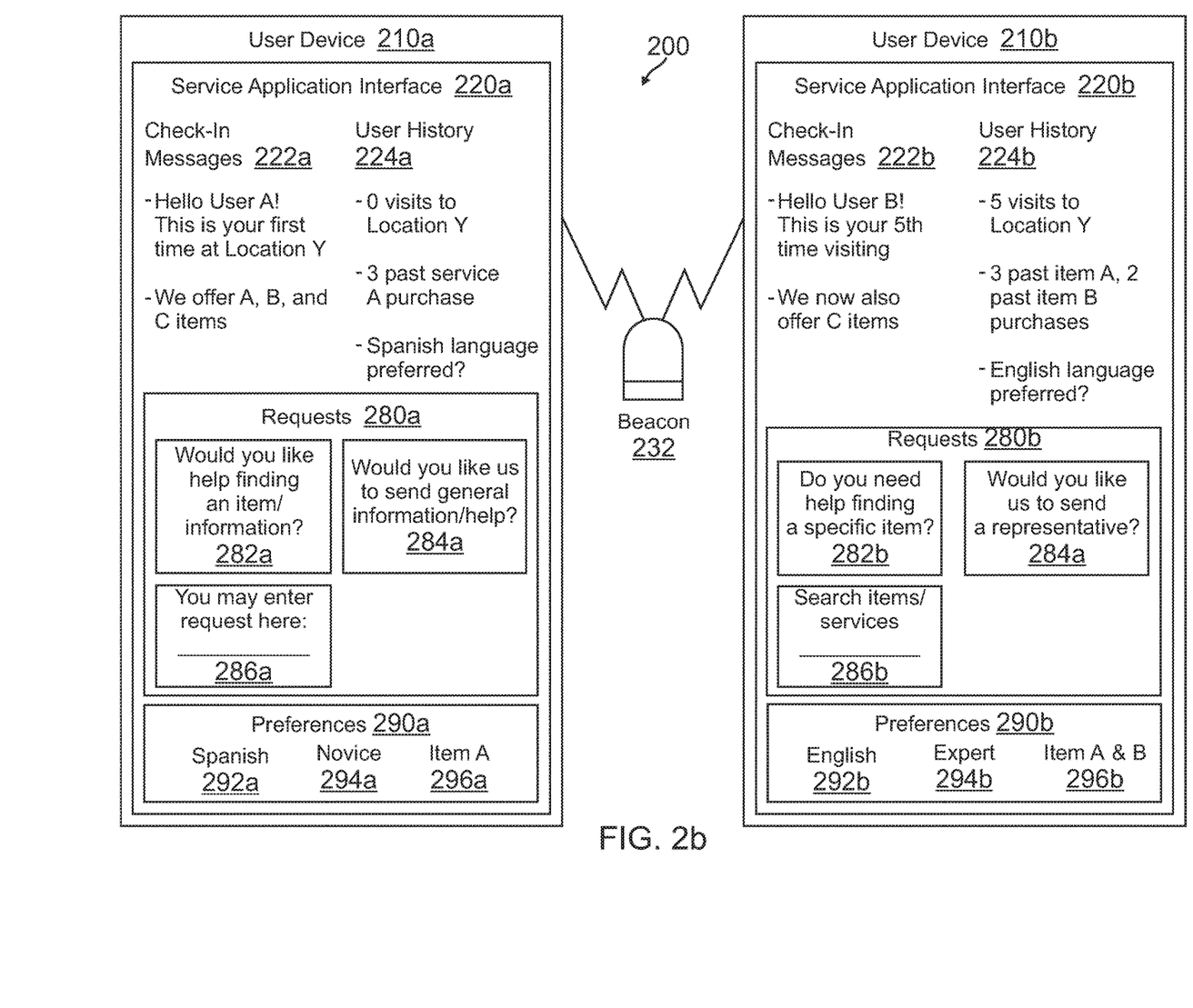
FIG. 2B is an exemplary environment with two checked-in user devices displaying targeted assistance for different user histories, according to an embodiment.

FIG. 2B is an exemplary environment with two checked-in user devices displaying targeted assistance for different user histories, according to an embodiment. FIG. 2B includes a user device 210a and a user device 210b corresponding generally to user device 110 of FIG. 1. Additionally, service application interface 220a and service application interface 220b corresponds generally to functions and processes described in reference to service application 120 of FIG. 1.

User device 210a and user device 210b may be checked-in to a service location through beacon 232. After check-in through beacon 232, user device 210a and user device 210b execute a service application each and display service application interface 220a and service application interface 220b, respectively, to individual users. Service application interface 220a includes check-in messages 222a, a user history 224a, requests 280a, and preferences 290a. Similarly, service application interface 220b includes check-in messages 222b, a user history 224b, requests 280b, and preferences 290b.

Check-in messages 222a and 222b include messages that may be transmitted to user device 210a and 210b on check-in with beacon 232. Check-in messages 222a include messages transmitted to user device 210a based on a user identifier transmitted by user device 210a to check-in with beacon 232. Thus, check-in messages 222a include a greeting corresponding to a first visit by user A (corresponding to user device 210a) and the type of items available at the service location. In contrast to check-in messages 222a, check-in messages 222b include a greeting for user B (corresponding to user device 210b) based on the number of visits by user B to the service location, and additional information about changes to the service location (e.g., that the service location now offers item C).

User history 224a and 224b may be displayable to user A and user B, respectively, so that user A and user B may view, change, and/or submit the information. For example, user A may view that they have 0 visits to location Y, the service location. However, user A may be utilizing a new device, and thus a different user identifier. Therefore, user A may choose to change and/or update the information in user history 224a. Additionally, based on the user identifier, Spanish may be a preset language preference, where user A may wish to select a different language. User B using user device 210b may view user history 224b corresponding to the user history for the identifier used to check in user device 210b. User B may similarly change and/or update user history 224b.

Requests 280a includes an option 282a, 284a, and 286a corresponding generally to determined targeted assistance for user A. Option 282a correspond to a request for assistance finding a particular item. Selection of option 282a may transmit information to user device 210a corresponding to an item or a set of items, such as a help menu that may assist user A in finding an item/information for the service location. In other embodiments, option 282a may enable a search of a specific entered item, such as an item entered into option 286a. However, in other embodiments, selection of option 282a may send in-person help to user A of user device 210a or provide other assistance. Similarly, option 284a may provide general informational help, a help menu corresponding generally to the service location, and/or in-person help to user A.

Requests 280b of user device 210b may perform similar functions to requests 280a of user device 210a. However, requests 280b may instead be targeted assistance for user B depending on an identifier for user B. Thus, an option 282b, 284b, and 286b may be targeted to the interests and required assistance for user B. Thus, option 282b may transmit a request for a particular item, such as a past searched item for user B or an item of interest (including items entered to option 286b). Additionally, due to user B's past requests and/or user history, option 284b may be customized to always send an in-person representative to user B.

Preferences 290a and 290b may correspond to assistance preferences determined from a user history of user A and user B, respectively. Thus, preferences 290a include a language 292a, an experience level 294a, and an item of interest 296a. These preferences may be determined from the user history, for example, the user history of user A 254a of FIG. 2A. Similarly, preferences 290b include a language 292b, an experience level 294b, and an item of interest 296b. These preferences may be determined from the user history, for example, the user history of user A 254b of FIG. 2A.

Figure 3:
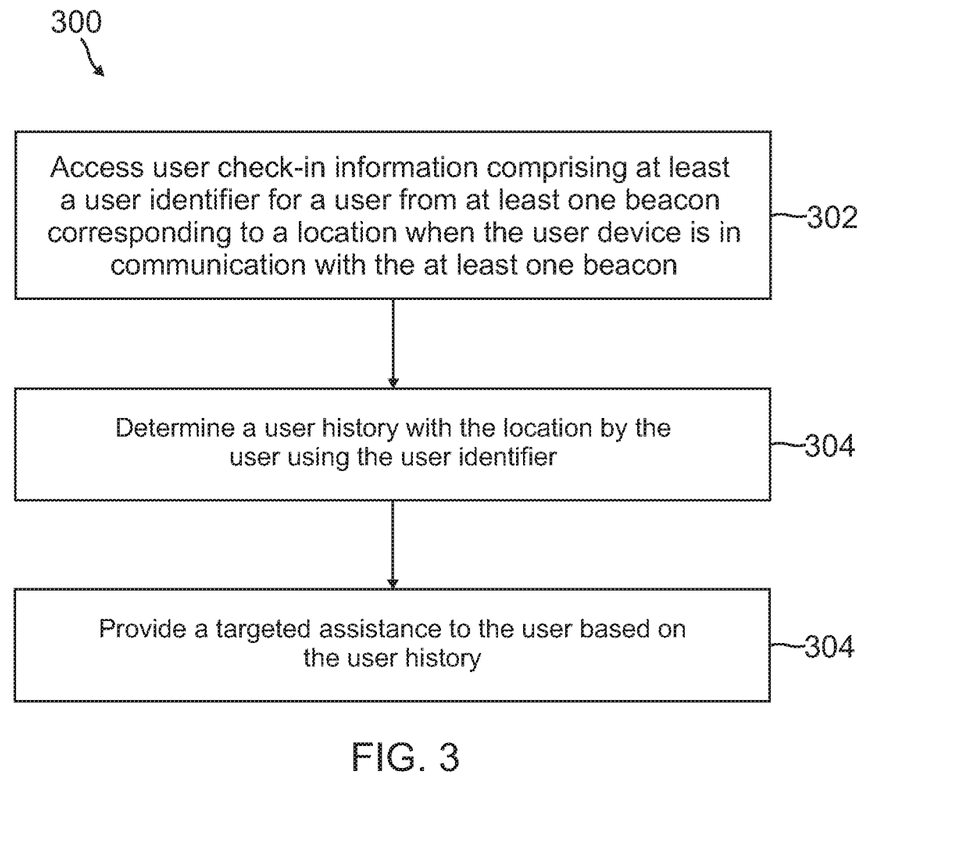
FIG. 3 is a flowchart of an exemplary process to provide targeted services on user check-in, according to an embodiment.

FIG. 3 is a flowchart of an exemplary process to provide targeted services on user check-in, according to an embodiment. Note that one or more steps, processes, and methods described herein may be omitted, performed in a different sequence, or combined as desired or appropriate.

At step 302, user check-in information comprising at least a user identifier for a user is accessed from at least one beacon corresponding to a location when the user device is in communication with the at least one beacon. The user device may be in communication with the at least one beacon when the user device is in proximity to the at least one beacon. Additionally, the user device and the at least one beacon may be in communication using one of near field communication, radio communication, infrared communication, Bluetooth communication, and Bluetooth low energy communication.

A user history with the location is determined using the user identifier, at step 304. The user history may comprise a number of visits to the location by the user through determining a number of check-ins of the user identifier. Additionally, the user history may be utilized to determine a user experience level with the location, a plurality of types of assistance for the user, and/or user disability needs.

At step 306, a targeted assistance is provided to the user based on the user history. The targeted assistance may further be provided based on other information determined from the user history, such as the user experience level with the location, the plurality of types of assistance for the user, and/or the user disability needs. Where the user history comprises a number of visits to the location by the user, the targeted assistance may be provided using the number of visits to the location, such as a general assistance for a first time visitor, or refined and/or specific assistance for a repeat visitor.

The user identifier may comprise at least one of a location of origin of the user identifier, a location of use of a user account corresponding to the user identifier, and a nationality of the user. The user identifier may also be utilized to determine user disability needs of the user, for example, by accessing other available information about the user using the user identifier. Thus, the targeted assistance may be provided by considering a location of origin for the user, such as a language of the user. Additionally, assistance targeted to a user's disability needs may also be provided to the user.

Figure 4:
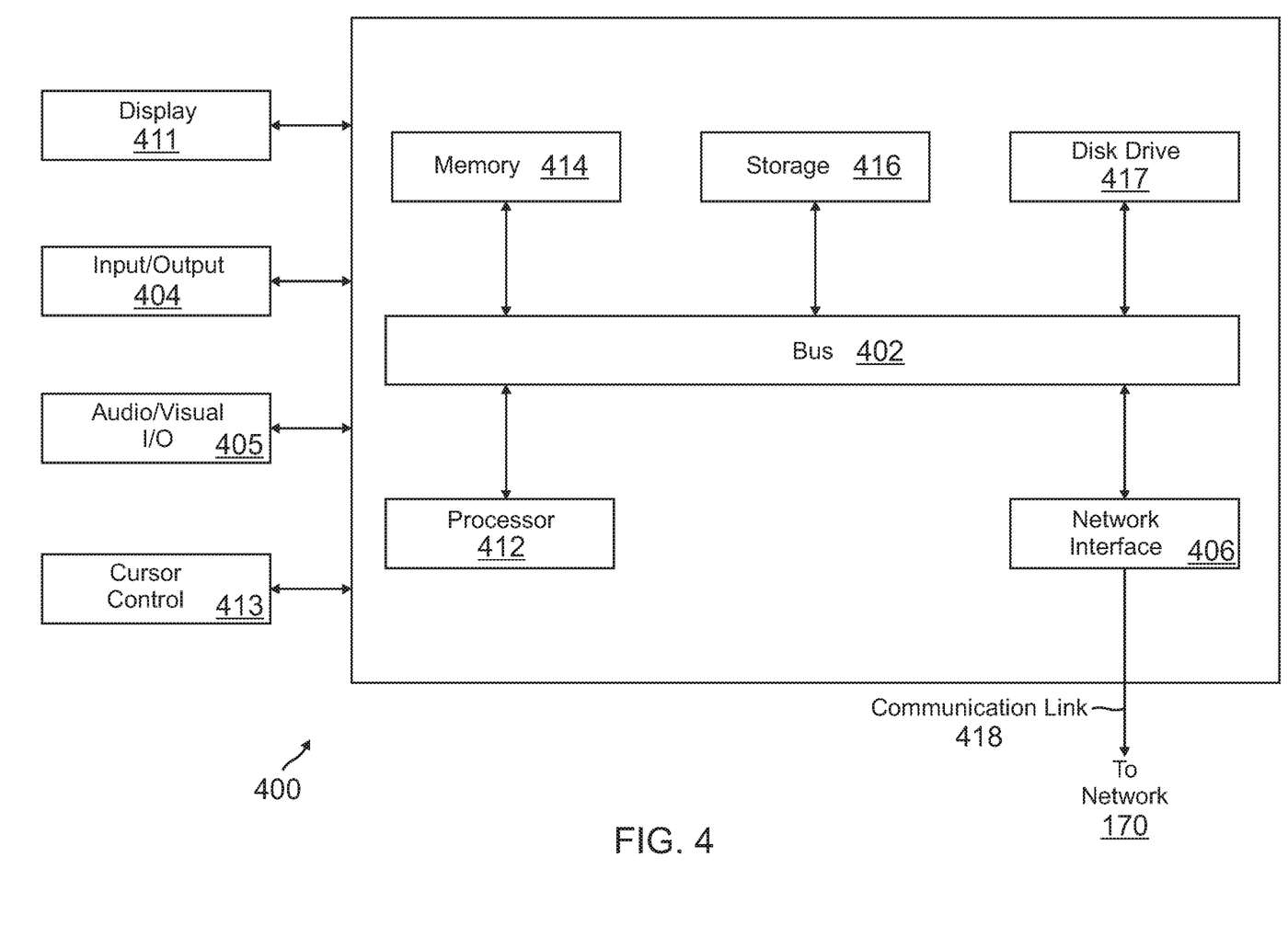
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant device, or a service provider server via network 160. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417.

Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   broadcasting, by a wireless beacon, a short range wireless signal at a location and comprising a beacon identifier for the wireless beacon and a wake-up process for an application on a mobile device that causes the application to activate and communicate with the wireless beacon, wherein the beacon identifier comprises a digital token stored on the mobile device;
   in response determining the application has been activated without user input from a user of the mobile device based on receiving the beacon identifier, increasing a power state of the wireless beacon, wherein the power state of the wireless beacon is increased to facilitate and maintain wireless communications with the mobile device through a short range wireless communication channel;
   transmitting a request to establish the short range wireless communication channel with the mobile device, wherein the request displays check-in request data on a graphical user interface (GUI) of the mobile device;
   in response to receiving an identifier from the mobile device, connecting, by the wireless beacon, to the mobile device through the short range wireless communication channel;
   automatically processing, based on the identifier, a check-in at the location for the mobile device with a server of a service provider without requiring the mobile device to connect with the server, wherein the automatically processing the check-in comprises:
      retrieving user data for the user from the mobile device, wherein the user data comprises a number of previous check-ins for the mobile device and an experience level setting for the user at one or more of the location or another location associated with the location;
      transmitting the user data and the identifier with the beacon identifier to the server of the service provider;
      receiving a plurality of targeted assistance options for the user at the location associated with the experience level for the user at the location based on the user data and the location;
      displaying the plurality of targeted assistance options and an option to change the experience level through the GUI of the mobile device; and
   requesting a targeted assistance option for the user from the server based on a selection from the plurality of targeted assistance options and/or the option to change the experience level;
   receiving, by the wireless beacon from the server, information for the targeted assistance option for the user; and
   updating the GUI with the information for the targeted assistance option.

2. The method of claim 1, further comprising:
   receiving an acceptance of the targeted assistance option from the mobile device; and
   communicating the acceptance to one of the service provider or a local device.

3. The method of claim 1, wherein the targeted assistance option is associated with user assistance preferences identified using the identifier.

4. The method of claim 1, wherein the beacon identifier identifies the location for the wireless beacon to the service provider.

5. The method of claim 1, further comprising:
receiving a request for the targeted assistance option from the mobile device;
detecting a merchant employee device within a communication range of the wireless beacon; and
communicating the request to the merchant employee device.

6. The method of claim 1, further comprising:
establishing, through the wireless beacon, a communication channel with the server of the service provider; and
passing, through the wireless beacon, additional information between the mobile device and the server of the service provider, wherein the additional information comprises at least one of an assistance request, an assistance preference, transaction information, payment information, or identification information.

7. The method of claim 1, wherein the request alerts the user of the check-in.

8. The method of claim 1, wherein the wireless beacon and the mobile device connect using one of near field communication, radio communication, infrared communication, Bluetooth communication, or Bluetooth low energy communication.

9. The method of claim 1, wherein the user data further comprises one of a location of origin of the user or the mobile device, a location of use of a user account associated with the user or the mobile device, a nationality of the user, a language of the user, or assistance information for disability assistance for the user.

10. A wireless beacon system comprising:
a non-transitory memory; and
one or more hardware processors coupled to the non-transitory memory and configured to read instructions from the non-transitory memory to cause the wireless beacon system to perform operations comprising:
broadcasting, by the wireless beacon system, a short range wireless signal at a location and comprising a beacon identifier for the wireless beacon system and a wake-up process for an application on a mobile device that causes the application to activate and communicate with the wireless beacon system, wherein the beacon identifier comprises a digital token stored on the mobile device;
in response to determining the application has been activated without user input from a user of the mobile device based on receiving the beacon identifier, increasing a power state of the wireless beacon system, wherein the power state of the wireless beacon system is increased to facilitate and maintain wireless communications with the mobile device through a short range wireless communication channel;
transmitting a request to establish the short range wireless communication channel with the mobile device, wherein the request causes check-in request data to be displayed on a graphical user interface (GUI) of the mobile device;
in response to receiving an identifier from the mobile device, connecting, by the wireless beacon system, to the mobile device through the short range wireless communication channel;
automatically processing, based on the identifier, a check-in at the location for the mobile device with a server of a service provider without requiring the mobile device to connect with the server, wherein the automatically processing the check-in comprises:
retrieving user data for the user from the mobile device, wherein the user data comprises a number of previous check-ins for the mobile device and an experience level setting for the user at one or more of the location or another location associated with the location;
transmitting the user data and the identifier with the beacon identifier to the server of the service provider;
receiving a plurality of targeted assistance options for the user at the location associated with the experience level for the user at the location based on the user data and the location;
displaying the plurality of targeted assistance options and an option to change the experience level through the GUI of the mobile device; and
requesting a targeted assistance option for the user from the server based on a selection from the plurality of targeted assistance options and/or the option to change the experience level;
receiving, by the wireless beacon system from the server, information for the targeted assistance option for the user; and
updating the GUI with the information for the targeted assistance option.

11. The wireless beacon system of claim 10, wherein the operations further comprise:
receiving an acceptance of the targeted assistance option from the mobile device; and
communicating the acceptance to one of the service provider or a local device.

12. The wireless beacon system of claim 10, wherein the targeted assistance option is associated with user assistance preferences identified using the identifier.

13. The wireless beacon system of claim 10, wherein the beacon identifier identifies the location for the wireless beacon system to the service provider.

14. The wireless beacon system of claim 10, wherein the operations further comprise:
receiving a request for the targeted assistance option from the mobile device;
detecting a merchant employee device within a communication range of the wireless beacon system; and
communicating the request to the merchant employee device.

15. The wireless beacon system of claim 10, wherein the operations further comprise:
establishing, through the wireless beacon system, a communication channel with the server of the service provider; and
passing, through the wireless beacon system, additional information between the mobile device and the server of the service provider, wherein the additional information comprises at least one of an assistance request, an assistance preference, transaction information, payment information, or identification information.

16. The wireless beacon system of claim 10, wherein the request alerts the user of the check-in.

17. The wireless beacon system of claim 10, wherein the wireless beacon system and the mobile device connect using one of near field communication, radio communication, infrared communication, Bluetooth communication, or Bluetooth low energy communication.

18. The wireless beacon system of claim 10, wherein the user data further comprises one of a location of origin of the user or the mobile device, a location of use of a user account associated with the user or the mobile device, a nationality of the user, a language of the user, or assistance information for disability assistance for the user.

19. A non-transitory machine-readable medium having stored thereon machine readable instructions executable to cause a machine to perform operations comprising:
broadcasting, by a wireless beacon, a short range wireless signal at a location and comprising a beacon identifier for the wireless beacon and a wake-up process for an application on a mobile device that causes the application to activate to communicate with the wireless beacon, wherein the beacon identifier comprises a digital token stored on the mobile device;
in response to determining the application has been activated without user input from a user of the mobile device based on receiving the beacon identifier, increasing a power state of the wireless beacon, wherein the power state of the wireless beacon is increased to facilitate and maintain wireless communications with the mobile device through a short range wireless communication channel;
transmitting a request to establish the short range wireless communication channel with the mobile device, wherein the request displays check-in request data on a graphical user interface (GUI) of the mobile device;
in response to receiving an identifier from the mobile device connecting, by the wireless beacon, to the mobile device through the short range wireless communication channel;
automatically processing, based on the identifier, a check-in at the location for the mobile device with a server of a service provider without requiring the mobile device to connect with the server, wherein the automatically processing the check-in comprises:
retrieving user data for the user from the mobile device, wherein the user data comprises a number of previous check-ins for the mobile device, an experience level setting for the user and information associated with previous targeted assistance provided to the user at one or more of the location or another location associated with the location;
transmitting the user data and the identifier with the beacon identifier to the server of the service provider;
receiving a plurality of targeted assistance options for the user at the location associated with the experience level for the user at the location based on the user data and the location;
displaying the plurality of targeted assistance options and an option to change the experience level through the GUI of the mobile device; and
requesting a targeted assistance option for the user from the server based on a selection from the plurality of targeted assistance options and/or the option to change the experience level;
receiving, by the wireless beacon from the server, information for the targeted assistance option for the user; and
updating the GUI with the information for the targeted assistance option.

20. The non-transitory machine-readable medium of claim 19, wherein the operations further comprise:
establishing, through the wireless beacon, a communication channel with the server for the service provider; and
passing, through the wireless beacon, additional information between the mobile device and the service provider, wherein the additional information comprises at least one of an assistance request, an assistance preference, transaction information, payment information, or identification information.

* * * * *

UNITED STATES PATENT AND TRADEMARK OFFICE
CERTIFICATE OF CORRECTION

PATENT NO.         : 10,600,098 B2
APPLICATION NO.    : 15/384169
DATED              : March 24, 2020
INVENTOR(S)        : Egan Schulz, Michelle Serrano and Libo Su Page 1 of 1

It is certified that error appears in the above-identified patent and that said Letters Patent is hereby corrected as shown below:

In the Specification

In the Detailed Description:

In Column 16, Line 42, change "110" to --I/O--.

Signed and Sealed this
Fourth Day of August, 2020

Andrei Iancu
*Director of the United States Patent and Trademark Office*